US011478980B2

(12) United States Patent
Morris et al.

(10) Patent No.: US 11,478,980 B2
(45) Date of Patent: Oct. 25, 2022

(54) SYSTEM FOR ADDITIVELY MANUFACTURING COMPOSITE STRUCTURE

(71) Applicant: Continuous Composites Inc., Coeur d'Alene, ID (US)

(72) Inventors: Rachael Kathleen Morris, Greenacres, WA (US); Ryan C. Stockett, Spokane, WA (US)

(73) Assignee: Continuous Composites Inc., Coeur d'Alene, ID (US)

( * ) Notice: Subject to any disclaimer, the term of this patent is extended or adjusted under 35 U.S.C. 154(b) by 317 days.

(21) Appl. No.: 16/744,902

(22) Filed: Jan. 16, 2020

(65) Prior Publication Data
US 2020/0238627 A1     Jul. 30, 2020

Related U.S. Application Data

(60) Provisional application No. 62/797,078, filed on Jan. 25, 2019.

(51) Int. Cl.
*B33Y 50/02*     (2015.01)
*B29C 64/118*    (2017.01)
(Continued)

(52) U.S. Cl.
CPC .......... *B29C 64/118* (2017.08); *B29C 64/106* (2017.08); *B29C 64/165* (2017.08);
(Continued)

(58) Field of Classification Search
CPC .................................................. B33Y 50/02
(Continued)

(56) References Cited

U.S. PATENT DOCUMENTS 3,286,305 A   11/1966   Seckel
3,809,514 A    5/1974   Nunez
(Continued)

FOREIGN PATENT DOCUMENTS

CN   108472720 A  *  8/2018  ............ B22D 11/01
DE     4102257 A1    7/1992
(Continued)

OTHER PUBLICATIONS

A. Di. Pietro & Paul Compston, Resin Hardness and interlaminar Shear Strength of a Glass-Fibre/Vinylester Composite Cured with High Intensity Ultraviolet (UV) Light, Journal of Materials Science, vol. 44, pp. 4188-4190 (Apr. 2009).
(Continued)

*Primary Examiner* — Suresh Suryawanshi
(74) *Attorney, Agent, or Firm* — Ryan C. Stockett

(57) ABSTRACT

A system is disclosed for use in additively manufacturing a structure. The system may include a print head configured to discharge a material, and a support connected to and configured to move the print head during discharging to fabricate a structure. The system may also include a receiver mounted to the print head and configured to generate a signal indicative of at least one of a shape, a size, and a location of the discharged material, and a processor in communication with the receiver and the support. The processor may be configured to generate a data cloud of the structure fabricated by the additive manufacturing system based on the signal and based on a known position of the receiver at a time of signal generation. The processor may also be configured to make a comparison of the data cloud and a virtual model of the structure during discharging, and to selectively affect discharging based on the comparison.

20 Claims, 5 Drawing Sheets

(51) Int. Cl.
  *B29C 64/188* (2017.01)
  *B29C 64/218* (2017.01)
  *B29C 64/241* (2017.01)
  *B29C 64/264* (2017.01)
  *B29C 64/314* (2017.01)
  *B29C 64/209* (2017.01)
  *B29C 64/393* (2017.01)
  *B29C 64/165* (2017.01)
  *G06F 30/23* (2020.01)
  *B29C 64/227* (2017.01)
  *B29C 64/106* (2017.01)
  *B29C 64/245* (2017.01)
  *B29C 64/295* (2017.01)
  *B33Y 40/00* (2020.01)
  *B33Y 10/00* (2015.01)
  *B33Y 30/00* (2015.01)
  *G06F 113/10* (2020.01)
  *B33Y 70/10* (2020.01)
  *B29K 105/08* (2006.01)

(52) U.S. Cl.
  CPC .......... *B29C 64/188* (2017.08); *B29C 64/209* (2017.08); *B29C 64/218* (2017.08); *B29C 64/227* (2017.08); *B29C 64/241* (2017.08); *B29C 64/245* (2017.08); *B29C 64/264* (2017.08); *B29C 64/295* (2017.08); *B29C 64/314* (2017.08); *B29C 64/393* (2017.08); *G06F 30/23* (2020.01); *B29K 2105/08* (2013.01); *B33Y 10/00* (2014.12); *B33Y 30/00* (2014.12); *B33Y 40/00* (2014.12); *B33Y 50/02* (2014.12); *B33Y 70/10* (2020.01); *G06F 2113/10* (2020.01)

(58) Field of Classification Search
  USPC ......................................................... 700/118
  See application file for complete search history.

(56) References Cited

U.S. PATENT DOCUMENTS

| | | |
|---|---|---|
| 3,984,271 A | 10/1976 | Gilbu |
| 3,993,726 A | 11/1976 | Moyer |
| 4,643,940 A | 2/1987 | Shaw et al. |
| 4,671,761 A | 6/1987 | Adrian et al. |
| 4,822,548 A | 4/1989 | Hempel |
| 4,851,065 A | 7/1989 | Curtz |
| 5,002,712 A | 3/1991 | Goldmann et al. |
| 5,037,691 A | 8/1991 | Medney et al. |
| 5,296,335 A | 3/1994 | Thomas et al. |
| 5,340,433 A | 8/1994 | Crump |
| 5,746,967 A | 5/1998 | Hoy et al. |
| 5,866,058 A | 2/1999 | Batchelder et al. |
| 5,936,861 A | 8/1999 | Jang et al. |
| 6,153,034 A | 11/2000 | Lipsker |
| 6,459,069 B1 | 10/2002 | Rabinovich |
| 6,501,554 B1 | 12/2002 | Hackney et al. |
| 6,799,081 B1 | 9/2004 | Hale et al. |
| 6,803,003 B2 | 10/2004 | Rigali et al. |
| 6,934,600 B2 | 8/2005 | Jang et al. |
| 7,039,485 B2 | 5/2006 | Engelbart et al. |
| 7,555,404 B2 | 6/2009 | Brennan et al. |
| 7,795,349 B2 | 9/2010 | Bredt et al. |
| 8,221,669 B2 | 7/2012 | Batchelder et al. |
| 8,962,717 B2 | 2/2015 | Roth et al. |
| 9,126,365 B1 | 9/2015 | Mark et al. |
| 9,126,367 B1 | 9/2015 | Mark et al. |
| 9,149,988 B2 | 10/2015 | Mark et al. |
| 9,156,205 B2 | 10/2015 | Mark et al. |
| 9,186,846 B1 | 11/2015 | Mark et al. |
| 9,186,848 B2 | 11/2015 | Mark et al. |
| 9,327,452 B2 | 5/2016 | Mark et al. |
| 9,327,453 B2 | 5/2016 | Mark et al. |
| 9,370,896 B2 | 6/2016 | Mark |
| 9,381,702 B2 | 7/2016 | Hollander |
| 9,457,521 B2 | 10/2016 | Johnston et al. |
| 9,458,955 B2 | 10/2016 | Hammer et al. |
| 9,527,248 B2 | 12/2016 | Hollander |
| 9,539,762 B2 | 1/2017 | Durand et al. |
| 9,579,851 B2 | 2/2017 | Mark et al. |
| 9,688,028 B2 | 6/2017 | Mark et al. |
| 9,694,544 B2 | 7/2017 | Mark et al. |
| 9,764,378 B2 | 9/2017 | Peters et al. |
| 9,770,876 B2 | 9/2017 | Farmer et al. |
| 9,782,926 B2 | 10/2017 | Witzel et al. |
| 2002/0009935 A1 | 1/2002 | Hsiao et al. |
| 2002/0062909 A1 | 5/2002 | Jang et al. |
| 2002/0113331 A1 | 8/2002 | Zhang et al. |
| 2002/0165304 A1 | 11/2002 | Mulligan et al. |
| 2003/0044539 A1 | 3/2003 | Oswald |
| 2003/0056870 A1 | 3/2003 | Comb et al. |
| 2003/0160970 A1 | 8/2003 | Basu et al. |
| 2003/0186042 A1 | 10/2003 | Dunlap et al. |
| 2003/0236588 A1 | 12/2003 | Jang et al. |
| 2005/0006803 A1 | 1/2005 | Owens |
| 2005/0061422 A1 | 3/2005 | Martin |
| 2005/0104257 A1 | 5/2005 | Gu et al. |
| 2005/0109451 A1 | 5/2005 | Hauber et al. |
| 2005/0230029 A1 | 10/2005 | Vaidyanathan et al. |
| 2007/0003650 A1 | 1/2007 | Schroeder |
| 2007/0228592 A1 | 10/2007 | Dunn et al. |
| 2008/0176092 A1 | 7/2008 | Owens |
| 2009/0095410 A1 | 4/2009 | Oldani |
| 2011/0032301 A1 | 2/2011 | Fienup et al. |
| 2011/0143108 A1 | 6/2011 | Fruth et al. |
| 2012/0060468 A1 | 3/2012 | Dushku et al. |
| 2012/0159785 A1 | 6/2012 | Pyles et al. |
| 2012/0231225 A1 | 9/2012 | Mikulak et al. |
| 2012/0247655 A1 | 10/2012 | Erb et al. |
| 2013/0164498 A1 | 6/2013 | Langone et al. |
| 2013/0209600 A1 | 8/2013 | Tow |
| 2013/0233471 A1 | 9/2013 | Kappesser et al. |
| 2013/0292039 A1 | 11/2013 | Peters et al. |
| 2013/0337256 A1 | 12/2013 | Farmer et al. |
| 2013/0337265 A1 | 12/2013 | Farmer |
| 2014/0034214 A1 | 2/2014 | Boyer et al. |
| 2014/0061974 A1 | 3/2014 | Tyler |
| 2014/0159284 A1 | 6/2014 | Leavitt |
| 2014/0232035 A1 | 8/2014 | Bheda |
| 2014/0268604 A1 | 9/2014 | Wicker et al. |
| 2014/0291886 A1 | 10/2014 | Mark et al. |
| 2015/0136455 A1 | 5/2015 | Fleming |
| 2015/0197062 A1* | 7/2015 | Shinar .................. B29C 64/393 700/98 |
| 2016/0012935 A1 | 1/2016 | Rothfuss |
| 2016/0031155 A1 | 2/2016 | Tyler |
| 2016/0046082 A1 | 2/2016 | Fuerstenberg |
| 2016/0052208 A1 | 2/2016 | Debora et al. |
| 2016/0082641 A1 | 3/2016 | Bogucki et al. |
| 2016/0082659 A1 | 3/2016 | Hickman et al. |
| 2016/0107379 A1 | 4/2016 | Mark et al. |
| 2016/0114532 A1 | 4/2016 | Schirtzinger et al. |
| 2016/0136885 A1 | 5/2016 | Nielsen-Cole et al. |
| 2016/0144565 A1 | 5/2016 | Mark et al. |
| 2016/0144566 A1 | 5/2016 | Mark et al. |
| 2016/0192741 A1 | 7/2016 | Mark |
| 2016/0200047 A1 | 7/2016 | Mark et al. |
| 2016/0243762 A1 | 8/2016 | Fleming et al. |
| 2016/0263806 A1 | 9/2016 | Gardiner |
| 2016/0263822 A1 | 9/2016 | Boyd |
| 2016/0263823 A1 | 9/2016 | Espiau et al. |
| 2016/0271876 A1 | 9/2016 | Lower |
| 2016/0297104 A1 | 10/2016 | Guillemette et al. |
| 2016/0311165 A1 | 10/2016 | Mark et al. |
| 2016/0325491 A1 | 11/2016 | Sweeney et al. |
| 2016/0332369 A1 | 11/2016 | Shah et al. |
| 2016/0339633 A1 | 11/2016 | Stolyarov et al. |
| 2016/0346998 A1 | 12/2016 | Mark et al. |
| 2016/0361869 A1 | 12/2016 | Mark et al. |
| 2016/0368213 A1 | 12/2016 | Mark |
| 2016/0368255 A1 | 12/2016 | Witte et al. |

(56) References Cited

U.S. PATENT DOCUMENTS

| | | |
|---|---|---|
| 2017/0007359 A1 | 1/2017 | Kopelman et al. |
| 2017/0007360 A1 | 1/2017 | Kopelman et al. |
| 2017/0007361 A1 | 1/2017 | Boronkay et al. |
| 2017/0007362 A1 | 1/2017 | Chen et al. |
| 2017/0007363 A1 | 1/2017 | Boronkay |
| 2017/0007365 A1 | 1/2017 | Kopelman et al. |
| 2017/0007366 A1 | 1/2017 | Kopelman et al. |
| 2017/0007367 A1 | 1/2017 | Li et al. |
| 2017/0007368 A1 | 1/2017 | Boronkay |
| 2017/0007386 A1 | 1/2017 | Mason et al. |
| 2017/0008333 A1 | 1/2017 | Mason et al. |
| 2017/0015059 A1 | 1/2017 | Lewicki |
| 2017/0015060 A1 | 1/2017 | Lewicki et al. |
| 2017/0021565 A1 | 1/2017 | Deaville |
| 2017/0028434 A1 | 2/2017 | Evans et al. |
| 2017/0028588 A1 | 2/2017 | Evans et al. |
| 2017/0028617 A1 | 2/2017 | Evans et al. |
| 2017/0028619 A1 | 2/2017 | Evans et al. |
| 2017/0028620 A1 | 2/2017 | Evans et al. |
| 2017/0028621 A1 | 2/2017 | Evans et al. |
| 2017/0028623 A1 | 2/2017 | Evans et al. |
| 2017/0028624 A1 | 2/2017 | Evans et al. |
| 2017/0028625 A1 | 2/2017 | Evans et al. |
| 2017/0028627 A1 | 2/2017 | Evans et al. |
| 2017/0028628 A1 | 2/2017 | Evans et al. |
| 2017/0028633 A1 | 2/2017 | Evans et al. |
| 2017/0028634 A1 | 2/2017 | Evans et al. |
| 2017/0028635 A1 | 2/2017 | Evans et al. |
| 2017/0028636 A1 | 2/2017 | Evans et al. |
| 2017/0028637 A1 | 2/2017 | Evans et al. |
| 2017/0028638 A1 | 2/2017 | Evans et al. |
| 2017/0028639 A1 | 2/2017 | Evans et al. |
| 2017/0028644 A1 | 2/2017 | Evans et al. |
| 2017/0030207 A1 | 2/2017 | Kittleson |
| 2017/0036403 A1 | 2/2017 | Ruff et al. |
| 2017/0050340 A1 | 2/2017 | Hollander |
| 2017/0057164 A1 | 3/2017 | Hemphill et al. |
| 2017/0057165 A1 | 3/2017 | Waldrop et al. |
| 2017/0057167 A1 | 3/2017 | Tooren et al. |
| 2017/0057181 A1 | 3/2017 | Waldrop et al. |
| 2017/0064840 A1 | 3/2017 | Espalin et al. |
| 2017/0066187 A1 | 3/2017 | Mark et al. |
| 2017/0087768 A1 | 3/2017 | Bheda |
| 2017/0106565 A1 | 4/2017 | Braley et al. |
| 2017/0120519 A1 | 5/2017 | Mark |
| 2017/0129170 A1 | 5/2017 | Kim et al. |
| 2017/0129171 A1 | 5/2017 | Gardner et al. |
| 2017/0129176 A1 | 5/2017 | Waatti et al. |
| 2017/0129182 A1 | 5/2017 | Sauti et al. |
| 2017/0129186 A1 | 5/2017 | Sauti et al. |
| 2017/0144375 A1 | 5/2017 | Waldrop et al. |
| 2017/0151728 A1 | 6/2017 | Kunc et al. |
| 2017/0157828 A1 | 6/2017 | Mandel et al. |
| 2017/0157831 A1 | 6/2017 | Mandel et al. |
| 2017/0157844 A1 | 6/2017 | Mandel et al. |
| 2017/0157851 A1 | 6/2017 | Nardiello et al. |
| 2017/0165908 A1 | 6/2017 | Pattinson et al. |
| 2017/0173868 A1 | 6/2017 | Mark |
| 2017/0182712 A1 | 6/2017 | Scribner et al. |
| 2017/0210074 A1 | 7/2017 | Ueda et al. |
| 2017/0217088 A1 | 8/2017 | Boyd et al. |
| 2017/0232674 A1 | 8/2017 | Mark |
| 2017/0259502 A1 | 9/2017 | Chapiro et al. |
| 2017/0259507 A1 | 9/2017 | Hocker |
| 2017/0266876 A1 | 9/2017 | Hocker |
| 2017/0274585 A1 | 9/2017 | Armijo et al. |
| 2017/0284876 A1 | 10/2017 | Moorlag et al. |
| 2018/0065307 A1* | 3/2018 | Stockett ............... B29C 70/382 |
| 2018/0126648 A1* | 5/2018 | Tyler .................... B29C 64/227 |
| 2020/0189200 A1* | 6/2020 | Mosher ................ B29C 64/393 |

FOREIGN PATENT DOCUMENTS

| | | |
|---|---|---|
| EP | 2589481 B1 | 1/2016 |
| EP | 3219474 A1 | 9/2017 |
| KR | 100995983 B1 | 11/2010 |
| KR | 101172859 B1 | 8/2012 |
| WO | 2013017284 A2 | 2/2013 |
| WO | 2016088042 A1 | 6/2016 |
| WO | 2016088048 A1 | 6/2016 |
| WO | 2016110444 A1 | 7/2016 |
| WO | 2016159259 A1 | 10/2016 |
| WO | 2016196382 A1 | 12/2016 |
| WO | 2017006178 A1 | 1/2017 |
| WO | 2017006324 A1 | 1/2017 |
| WO | 2017051202 A1 | 3/2017 |
| WO | 2017081253 A1 | 5/2017 |
| WO | 2017085649 A1 | 5/2017 |
| WO | 2017087663 A1 | 5/2017 |
| WO | 2017108758 A1 | 6/2017 |
| WO | 2017122941 A1 | 7/2017 |
| WO | 2017122942 A1 | 7/2017 |
| WO | 2017122943 A1 | 7/2017 |
| WO | 2017123726 A1 | 7/2017 |
| WO | 2017124085 A1 | 7/2017 |
| WO | 2017126476 A1 | 7/2017 |
| WO | 2017126477 A1 | 7/2017 |
| WO | 2017137851 A2 | 8/2017 |
| WO | 2017142867 A1 | 8/2017 |
| WO | 2017150186 A1 | 9/2017 |

OTHER PUBLICATIONS

A. Endruweit, M. S. Johnson, & A. C. Long, Curing of Composite Components by Ultraviolet Radiation: A Review, Polymer Composites, pp. 119-128 (Apr. 2006).

C. Fragassa, & G. Minak, Standard Characterization for Mechanical Properties of Photopolymer Resins for Rapid Prototyping, 1st Symposium on Multidisciplinary Studies of Design in Mechanical Engineering, Bertinoro, Italy (Jun. 25-28, 2008).

Hyouk Ryeol Choi and Se-gon Roh, In-pipe Robot with Active Steering Capability for Moving Inside of Pipelines, Bioinspiration and Robotics: Walking and Climbing Robots, Sep. 2007, p. 544, I-Tech, Vienna, Austria.

Kenneth C. Kennedy II & Robert P. Kusy, UV-Cured Pultrusion Processing of Glass-Reinforced Polymer Composites, Journal of Vinyl and Additive Technology, vol. 1, Issue 3, pp. 182-186 (Sep. 1995).

M. Martin-Gallego et al., Epoxy-Graphene UV-Cured Nanocomposites, Polymer, vol. 52, Issue 21, pp. 4664-4669 (Sep. 2011).

P. Compston, J. Schiemer, & A. Cvetanovska, Mechanical Properties and Styrene Emission Levels of a UV-Cured Glass-Fibre/ Vinylester Composite, Composite Structures, vol. 86, pp. 22-26 (Mar. 2008).

S Kumar & J.-P. Kruth, Composites by Rapid Prototyping Technology, Materials and Design, (Feb. 2009).

S. L. Fan, F. Y. C. Boey, & M. J. M. Abadie, UV Curing of a Liquid Based Bismaleimide-Containing Polymer System, eXPRESS Polymer Letters, vol. 1, No. 6, pp. 397-405 (2007).

T. M. Llewelly-Jones, Bruce W. Drinkwater, and Richard S. Trask; 3D Printed Components With Ultrasonically Arranged Microscale Structure, Smart Materials and Structures, 2016, pp. 1-6, vol. 25, IOP Publishing Ltd., UK.

Vincent J. Lopata et al., Electron-Beam-Curable Epoxy Resins for the Manufacture of High-Performance Composites, Radiation Physics and Chemistry, vol. 56, pp. 405-415 (1999).

Yugang Duan et al., Effects of Compaction and UV Exposure on Performance of Acrylate/Glass-Fiber Composites Cured Layer by Layer, Journal of Applied Polymer Science, vol. 123, issue 6, pp. 3799-3805 (May 15, 2012).

* cited by examiner

SYSTEM FOR ADDITIVELY MANUFACTURING COMPOSITE STRUCTURE

RELATED APPLICATION

This application is based on and claims the benefit of priority from U.S. Provisional Application No. 62/797,078 that was filed on Jan. 25, 2019, the contents of which are expressly incorporated herein by reference.

TECHNICAL FIELD

The present disclosure relates generally to a manufacturing system and, more particularly, to a system for additively manufacturing composite structures.

BACKGROUND

Continuous fiber 3D printing (a.k.a., CF3D®) involves the use of continuous fibers embedded within a matrix discharging from a moveable print head. The matrix can be a traditional thermoplastic, a powdered metal, a liquid resin (e.g., a UV curable and/or two-part resin), or a combination of any of these and other known matrixes. Upon exiting the print head, a head-mounted cure enhancer (e.g., a UV light, an ultrasonic emitter, a heat source, a catalyst supply, etc.) is activated to initiate and/or complete curing of the matrix. This curing occurs almost immediately, allowing for unsupported structures to be fabricated in free space. When fibers, particularly continuous fibers, are embedded within the structure, a strength of the structure may be multiplied beyond the matrix-dependent strength. An example of this technology is disclosed in U.S. Pat. No. 9,511,543 that issued to Tyler on Dec. 6, 2016 ("the '543 patent").

Although CF3D® provides for increased strength, compared to manufacturing processes that do not utilize continuous fiber reinforcement, improvements can be made to the structure and/or operation of existing systems. For example, the disclosed additive manufacturing system is uniquely configured to provide these improvements and/or to address other issues of the prior art.

SUMMARY

In one aspect, the present disclosure is directed to an additive manufacturing system for use in discharging a continuous reinforcement. The additive manufacturing system may include a print head configured to discharge a material, and a support connected to and configured to move the print head during discharging to fabricate a structure. The system may also include a receiver mounted to the print head and configured to generate a signal indicative of at least one of a shape, a size, and a location of the discharged material, and a processor in communication with the receiver and the support. The processor may be configured to generate a data cloud of the structure fabricated by the additive manufacturing system based on the signal and based on a known position of the receiver at a time of signal generation. The processor may also be configured to make a comparison of the data cloud and a virtual model of the structure during discharging, and to selectively affect discharging based on the comparison.

In another aspect, the present disclosure is directed to a method of additively manufacturing a structure. The method may include discharging a material from a print head, and moving the print head during discharging to fabricate the structure. The method may further include generating a signal indicative of at least one of a shape, a size, and a location of the discharged material, and generating a data cloud of the structure during discharging based on the signal. The method may further include making a comparison of the data cloud and a virtual model of the structure during discharging, and selectively affecting discharging based on the comparison.

DETAILED DESCRIPTION

Figure 1:
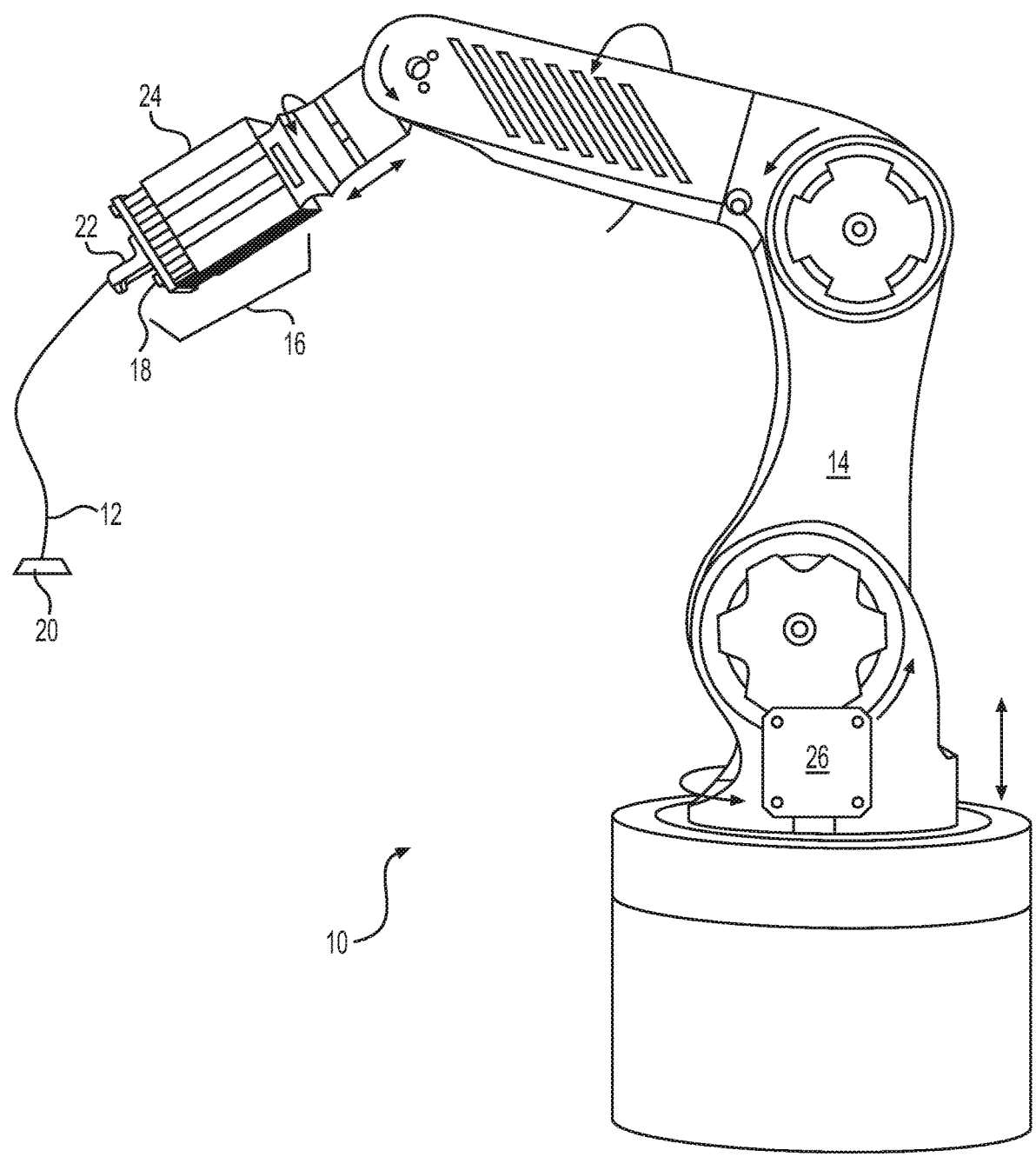
FIG. 1 is a diagrammatic illustration of an exemplary disclosed additive manufacturing system.

FIG. 1 illustrates an exemplary system 10, which may be used to manufacture a composite structure 12 having any desired shape. System 10 may include a support 14 and deposition head ("head") 16. Head 16 may be coupled to and moved by support 14. In the disclosed embodiment of FIG. 1, support 14 is a robotic arm capable of moving head 16 in multiple directions during fabrication of structure 12. Support 14 may alternatively embody a gantry (e.g., an overhead-bridge or single-post gantry) or a hybrid gantry/arm also capable of moving head 16 in multiple directions during fabrication of structure 12. Although support 14 is shown as being capable of 6-axis movements, it is contemplated that support 14 may be capable of moving head 16 in a different manner (e.g., along or around a greater or lesser number of axes). In some embodiments, a drive may mechanically couple head 16 to support 14, and include components that cooperate to move portions of and/or supply power or materials to head 16.

Figure 2:
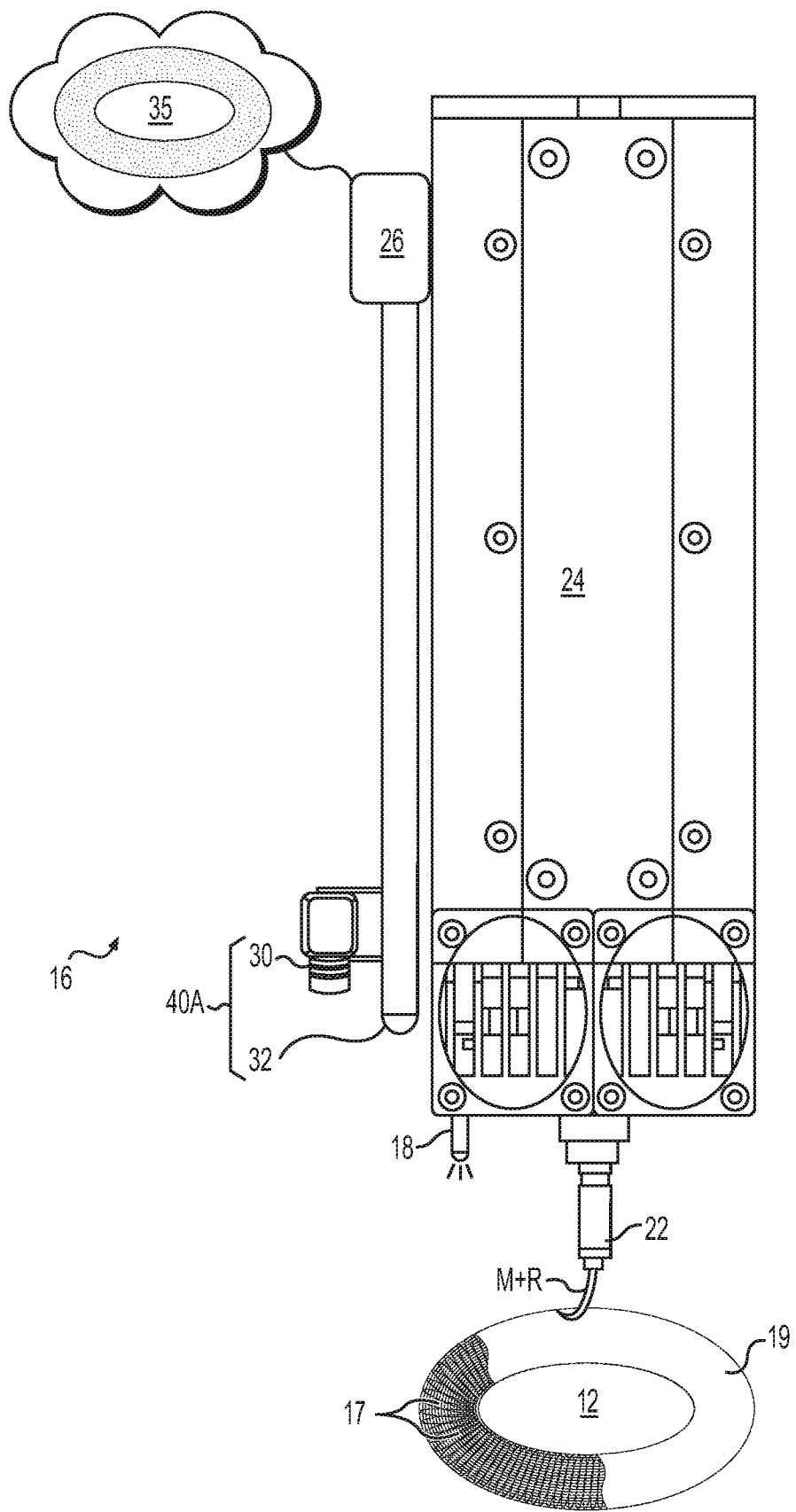
FIG. 2 is a diagrammatic illustrations of an exemplary disclosed head portion of the system of FIG. 1.

As shown in FIG. 2, structure 12 may include an internal skeleton 17 that is covered by an external skin 19. In some embodiments, these components of structure 12 may be fabricated separately and subsequently joined (e.g., via mechanical fastening, chemical adhesion, molecular bonding, etc.). For example, skeleton 17 may be fabricated from a first additive manufacturing process, while skin 19 may be manufactured directly onto skeleton 17 from a second and different additive manufacturing process. It is contemplated that both skeleton 17 and skin 19 could be manufactured separately from the same additive manufacturing process, if desired. In other embodiments, the components may be fabricated together as an integral monolithic structure (e.g., a structure that cannot be disassembled without at least some destruction).

Head 16 may be configured to receive or otherwise contain a matrix M that can be used to fabricate one or both of skeleton 17 and skin 19. The matrix may include any types or combinations of materials (e.g., a liquid resin, such as a zero-volatile organic compound resin, a powdered metal, etc.) that are curable. Exemplary resins include thermosets, single- or multi-part epoxy resins, polyester resins, cationic epoxies, acrylated epoxies, urethanes, esters, thermoplastics, photopolymers, polyepoxides, thiols, alkenes, thiol-enes, and more. In one embodiment, the matrix inside head 16 may be pressurized (e.g., positively and/or negatively), for example by an external device (e.g., by an extruder, a pump, etc.—not shown) that is fluidly connected to head 16 via a corresponding conduit (not shown). In another embodiment, however, the pressure may be generated completely inside of head 16 by a similar type of device. In yet other embodiments, the matrix may be gravity-fed into and/or through head 16. For example, the matrix may be fed into head 16, and pushed or pulled out of head 16 along with one or more continuous reinforcements. In some instances, the matrix inside head 16 may need to be kept cool and/or dark in order to inhibit premature curing or otherwise obtain a desired rate of curing after discharge. In other instances, the matrix may need to be kept warm and/or illuminated for similar reasons. In either situation, head 16 may be specially configured (e.g., insulated, temperature-controlled, shielded, etc.) to provide for these needs.

The matrix may be used to at least partially coat any number of continuous reinforcements (e.g., separate fibers, tows, rovings, socks, and/or sheets of continuous material) R and, together with the reinforcements, make up a portion (e.g., a wall) of composite structure 12. The reinforcements may be stored within or otherwise passed through head 16. When multiple reinforcements are simultaneously used, the reinforcements may be of the same material composition and have the same sizing and cross-sectional shape (e.g., circular, square, rectangular, etc.), or a different material composition with different sizing and/or cross-sectional shapes. The reinforcements may include, for example, carbon fibers, vegetable fibers, wood fibers, mineral fibers, glass fibers, plastic fibers, metallic fibers, optical fibers (e.g., tubes), etc. It should be noted that the term "reinforcement" is meant to encompass both structural and non-structural (e.g., functional) types of continuous materials that are at least partially encased in the matrix discharging from head 16.

The reinforcements may be at least partially coated with the matrix while the reinforcements are inside head 16, while the reinforcements are being passed to head 16, and/or while the reinforcements are discharging from head 16. The matrix, dry (e.g., unimpregnated) reinforcements, and/or reinforcements that are already exposed to the matrix (e.g., pre-impregnated reinforcements) may be transported into head 16 in any manner apparent to one skilled in the art. In some embodiments, a filler material (e.g., chopped fibers, nano particles or tubes, etc.) and/or additives (e.g., thermal initiators, UV initiators, etc.) may be mixed with the matrix before and/or after the matrix coats the continuous reinforcements.

One or more cure enhancers (e.g., a UV light, an ultrasonic emitter, a laser, a heater, a catalyst dispenser, etc.) 18 may be mounted proximate (e.g., within, on, and/or adjacent) head 16 and configured to enhance a cure rate and/or quality of the matrix as it is discharged from head 16. Cure enhancer 18 may be controlled to selectively expose portions of structure 12 to energy (e.g., UV light, electromagnetic radiation, vibrations, heat, a chemical catalyst, etc.) during material discharge and the formation of structure 12. The energy may trigger a chemical reaction to occur within the matrix, increase a rate of the chemical reaction, sinter the matrix, harden the matrix, solidify the material, polymerize the material, or otherwise cause the matrix to cure as it discharges from head 16. The amount of energy produced by cure enhancer 18 may be sufficient to cure the matrix before structure 12 axially grows more than a predetermined length away from head 16. In one embodiment, structure 12 is completely cured before the axial growth length becomes equal to an external diameter of the matrix-coated reinforcement.

The matrix and/or reinforcement may be discharged from head 16 via any number of different modes of operation. In a first example mode of operation, the matrix and/or reinforcement are extruded (e.g., pushed under pressure and/or mechanical force) from head 16 as head 16 is moved by support 14 to create features of structure 12. In a second example mode of operation, at least the reinforcement is pulled from head 16, such that a tensile stress is created in the reinforcement during discharge. In this second mode of operation, the matrix may cling to the reinforcement and thereby also be pulled from head 16 along with the reinforcement, and/or the matrix may be discharged from head 16 under pressure along with the pulled reinforcement. In the second mode of operation, where the matrix is being pulled from head 16 with the reinforcement, the resulting tension in the reinforcement may increase a strength of structure 12 (e.g., by aligning the reinforcements, inhibiting buckling, etc.) after curing of the matrix, while also allowing for a greater length of unsupported structure 12 to have a straighter trajectory. That is, the tension in the reinforcement remaining after curing of the matrix may act against the force of gravity (e.g., directly and/or indirectly by creating moments that oppose gravity) to provide support for structure 12.

The reinforcement may be pulled from head 16 as a result of head 16 being moved by support 14 away from an anchor point (e.g., a print bed, an existing surface of structure 12—shown in FIG. 2, a fixture 20—shown in FIG. 1, etc.). In particular, at the start of structure formation, a length of matrix-impregnated reinforcement may be pulled and/or pushed from head 16, deposited onto the anchor point, and at least partially cured, such that the discharged material adheres (or is otherwise coupled) to the anchor point. Thereafter, head 16 may be moved away from the anchor point, and the relative movement may cause the reinforcement to be pulled from head 16. It is contemplated that the movement of reinforcement through head 16 may be selectively assisted via one or more internal feed mechanisms, if desired. However, the discharge rate of reinforcement from head 16 may primarily be the result of relative movement between head 16 and the anchor point, such that tension is created within the reinforcement. As discussed above, the anchor point could be moved away from head 16 instead of or in addition to head 16 being moved away from the anchor point.

As further illustrated in FIG. 2, head 16 may include, among other things, an outlet 22 and a matrix reservoir 24 located upstream of outlet 22. In one example, outlet 22 is a single-channel nozzle configured to discharge composite material having a generally circular, tubular, or rectangular cross-section. The configuration of head 16, however, may allow outlet 22 to be swapped out for another outlet (e.g., a nozzle-less outlet) that discharges multiple channels of composite material having different shapes (e.g., a flat or sheet-like cross-section, a multi-track cross-section, etc.). Fibers, tubes, and/or other reinforcements may pass through matrix reservoir 24 and be wetted (e.g., at least partially coated and/or fully saturated) with matrix prior to discharge.

Figure 3:
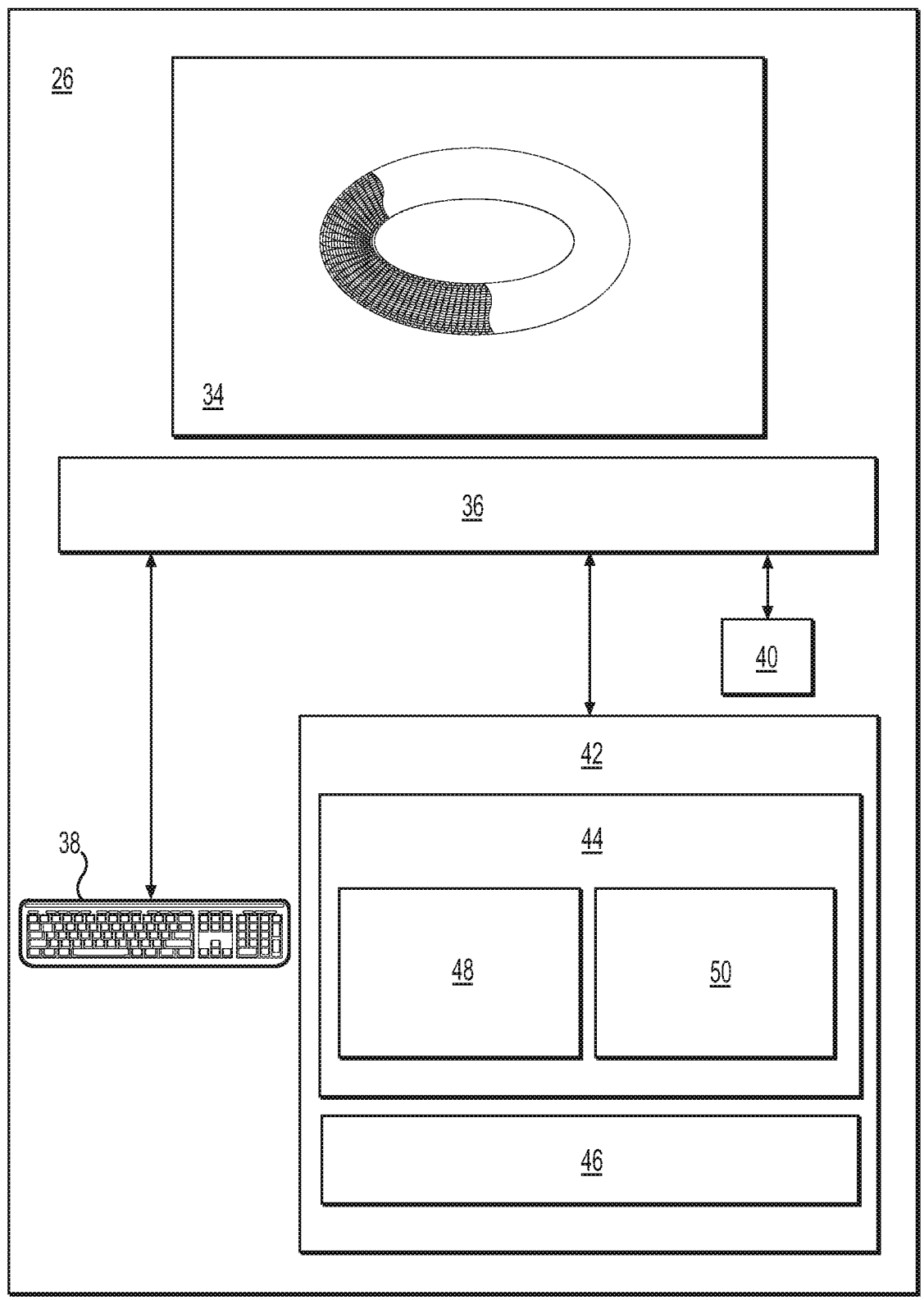
FIGS. 3 and 4 are schematic illustrations of an exemplary control portion of the system of FIG. 1.

Any number of separate computing devices 26 may be used to design and/or control the wetting, placement, curing, tension, etc. of reinforcements within structure 12 and/or to analyze characteristics of structure 12 before, during, and/or after fabrication. An exemplary computing device 26 is illustrated in detail in FIG. 3. As shown in this figure, computing device 26 may include, among other things, a display 34, one or more processors 36, any number of input/output ("I/O") devices 38, any number of peripherals 40, and one or more memories 42 for storing programs 44 and data 46. Programs 44 may include, for example, any number of design and/or printing apps 48 and an operating system 50.

Display 34 of computing device 26 may include a liquid crystal display (LCD), a light emitting diode (LED) screen, an organic light emitting diode (OLED) screen, and/or another known display device. Display 34 may be used for presentation of data under the control of processor 36.

Processor 36 may be a single or multi-core processor configured with virtual processing technologies, and use logic to simultaneously execute and control any number of operations. Processor 36 may be configured to implement virtual machine or other known technologies to execute, control, run, manipulate, and store any number of software modules, applications, programs, etc. In addition, in some embodiments, processor 36 may include one or more specialized hardware, software, and/or firmware modules (not shown) specially configured with particular circuitry, instructions, algorithms, and/or data to perform functions of the disclosed methods. It is appreciated that other types of processor arrangements could be implemented that provide for the capabilities disclosed herein.

Memory 42 can be a volatile or non-volatile, magnetic, semiconductor, tape, optical, removable, non-removable, or other type of storage device or tangible and/or non-transitory computer-readable medium that stores one or more executable programs 44, such as data capture, analysis, and/or printing apps 48 and operating system 50. Common forms of non-transitory media include, for example, a flash drive, a flexible disk, a hard disk, a solid state drive, magnetic tape or other magnetic data storage medium, a CD-ROM or other optical data storage medium, any physical medium with patterns of holes, a RAM, a PROM, an EPROM, a FLASH-EPROM or other flash memory, NVRAM, a cache, a register or other memory chip or cartridge, and networked versions of the same.

Memory 42 may store instructions that enable processor 36 to execute one or more applications, such as design, analysis, and/or fabrication apps 48, operating system 50, and any other type of application or software known to be available on computer systems. Alternatively or additionally, the instructions, application programs, etc. can be stored in an internal and/or external database (e.g., a cloud storage system—not shown) that is in direct communication with computing device 26, such as one or more databases or memories accessible via one or more networks (not shown). Memory 42 can include one or more memory devices that store data and instructions used to perform one or more features of the disclosed embodiments. Memory 42 can also include any combination of one or more databases controlled by memory controller devices (e.g., servers, etc.) or software, such as document management systems, Microsoft SQL databases, SharePoint databases, Oracle™ databases, Sybase™ databases, or other relational and/or non-relational databases.

In some embodiments, computing device 26 is communicatively connected to one or more remote memory devices (e.g., remote databases—not shown) through a network (not shown). The remote memory devices can be configured to store information that computing device 26 can access and/or manage. By way of example, the remote memory devices could be document management systems, Microsoft SQL database, SharePoint databases, Oracle™ databases, Sybase™ databases, Cassandra, HBase, or other relational or non-relational databases or regular files. Systems and methods consistent with disclosed embodiments, however, are not limited to separate databases or even to the use of a database.

Programs 44 may include one or more software or firmware modules causing processor 36 to perform one or more functions of the disclosed embodiments. Moreover, processor 36 can execute one or more programs located remotely from computing device 26. For example, computing device 26 can access one or more remote programs that, when executed, perform functions related to disclosed embodiments. In some embodiments, programs 44 stored in memory 42 and executed by processor 36 can include one or more of design, fabrication, and/or analysis apps 48 and operating system 50. Apps 48 may cause processor 36 to perform one or more functions of the disclosed methods.

Operating system 50 may perform known operating system functions when executed by one or more processors such as processor 36. By way of example, operating system 50 may include Microsoft Windows™, Unix™, Linux™, OSX™, and IOS™ operating systems, Android™ operating systems, or another type of operating system 50. Accordingly, disclosed embodiments can operate and function with computer systems running any type of operating system 50.

I/O devices 38 may include one or more interfaces for receiving signals or input from a user and/or system 10, and for providing signals or output to system 10 that allow structure 12 to be printed. For example, computing device 26 can include interface components for interfacing with one or more input devices, such as one or more keyboards, mouse devices, and the like, which enable computing device 26 to receive input from a user.

Figure 4:
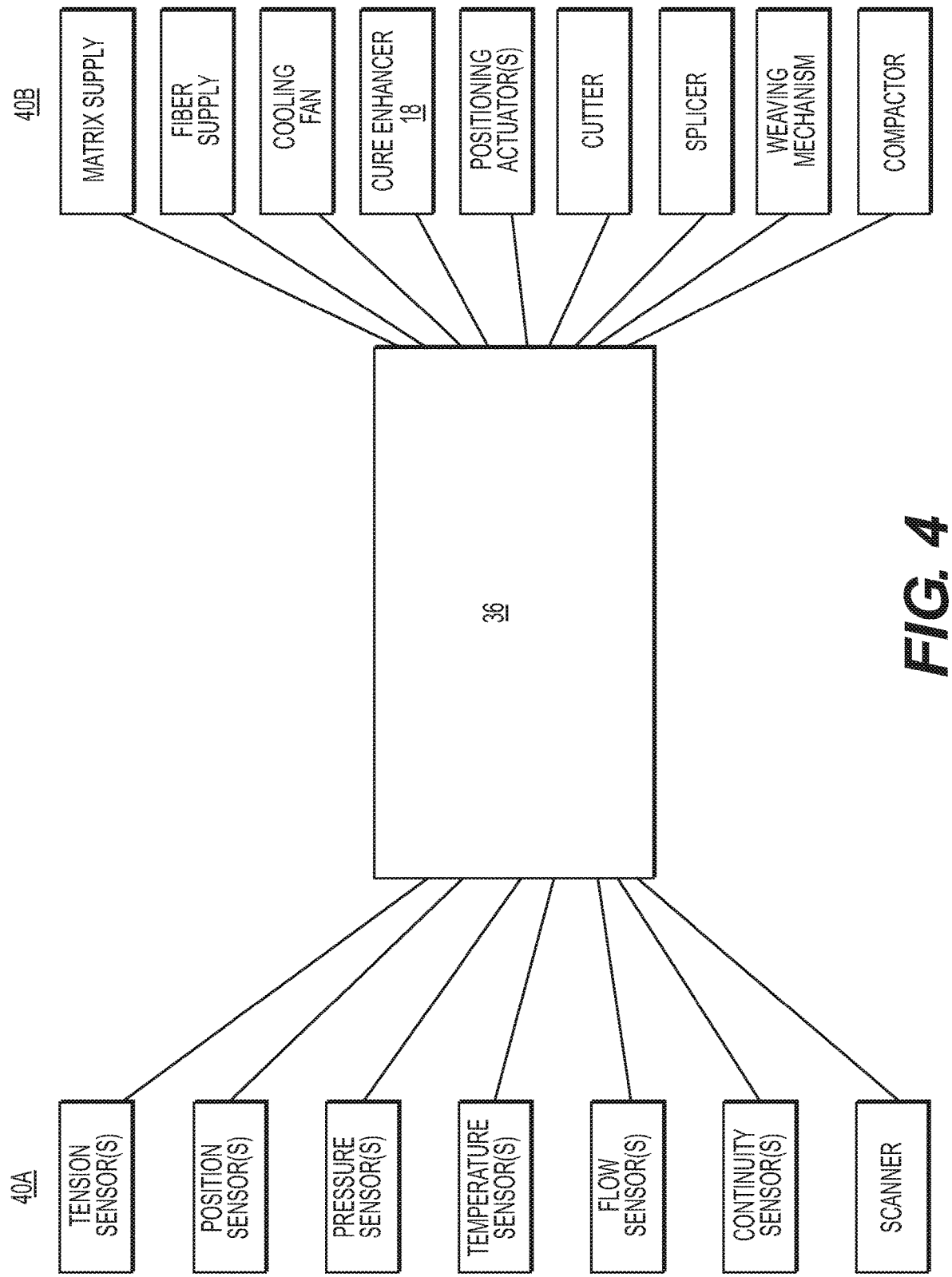

Peripheral device(s) 40 may be standalone devices or devices that are embedded within or otherwise associated with other components (e.g., support 14 and/or head 16) of system 10 and used during fabrication of structure 12. As shown in FIG. 4, peripherals 40 can embody input devices (e.g., one or more sensors, such as tension sensors, position sensors, pressure sensors, temperature sensors, flow sensors, continuity sensors, humidity sensors, rotary encoders, optical scanners, and other sensors known in the art) 40A and/or output devices (e.g., one or more actuators, such as a matrix supply, a fiber supply, a cooling fan, a pump, cure enhancer(s) 18, a positioning motor, a cutter, a splicer, a weaving mechanism, a fiber guide, a mixer, a feed roller, a compactor, a friction tensioner, etc.) 40B. In some embodiments, peripherals 40 may, themselves, include one or more processors, a memory, and/or a transceiver. When peripheral device(s) 40 are equipped with a dedicated processor and memory, the dedicated processor may be configured to execute instructions stored on the memory to receive commands from processor 36 associated with video, audio, other sensory data, control data, location data, etc., including capture commands, processing commands, motion commands, and/or transmission commands. The transceiver may include a wired or wireless communication device capable of transmitting data to or from one or more other components in system 10. In some embodiments, the transceiver can receive data from processor 36, including instructions for sensor and/or actuator activation and for the transmission of data via the transceiver. In response to the received instructions, the transceiver can packetize and transmit data between processor 36 and the other components.

Returning to FIG. 3, design, fabrication, and/or analysis apps 48 may cause computing device 26 to perform methods related to generating, receiving, processing, analyzing, storing, and/or transmitting data in association with operation of system 10 and corresponding design/fabrication/analysis of structure 12. For example, apps 48 may be able to configure processor 36 to perform operations including: displaying a graphical user interface (GUI) on display 34 for receiving design/control instructions and information from the operator of system 10; capturing sensory data associated with system 10 (e.g., via input devices 40A); receiving instructions via I/O devices 38 and/or the user interface regarding specifications, desired characteristics, and/or desired performance of structure 12; processing the control instructions; generating one or more possible designs of and/or plans for fabricating structure 12; analyzing and/or optimizing the designs and/or plans; providing recommendations of one or more designs and/or plans; controlling system 10 to fabricate a recommended and/or selected design via a recommended and/or selected plan; monitoring and/or analyzing the fabrication in real or near-real time; and/or providing feedback and adjustments (e.g., via output devices 40b) to system 10 for improving current and/or future fabrications.

Returning to FIG. 2, an exemplary input device 40A is illustrated as being operatively connected to head 16. In this example, input device 40A includes at least one receiver (e.g., a camera, a light sensor, etc.) 30 and one or more sources of visible and/or invisible light (e.g., a laser and/or other sources) 32 that are together configured to generate signals indicative of an actual shape, size, and/or position of composite material deposited by outlet 22. In some instances, receiver 30 and light source 32 are packaged together as a single unit. In the same or other instances, light source 32 may be cure enhancer 18 (e.g., a single source that performs both functions).

Receiver(s) 30 may be located at a trailing side of outlet 22 during operation, so as to capture and/or record the position of composite material being extruded by outlet 22. In one example, receiver(s) 30 are further located at a trailing side of any associated compactor, wiper, and/or other trailing component. It is contemplated, however, that one or more of receiver(s) 30 could be located between any of these components, if desired.

In one embodiment, receiver(s) 30 may be configured to capture surface images of the deposited material, while the light source(s) 32 are continuously energized or selectively flashed on-and-off. Surface features may be recognized from the images (e.g., by computing device 26 via image recognition software) and/or compiled into one or more comprehensive maps (e.g., a data cloud 35) of the material surface that are stored within memory 42. In another embodiment, signals indicative of the surface geometry are generated in response to reflected light, sound waves, magnetic waves, etc. being detected by receiver(s) 30. For example, a laser-type light or other energy source 32 may be configured scan the material surface, while receiver(s) 30 generate a plurality of stripes and/or points associated with light or energy reflecting off the surface. These stripes and/or points can also be collected as a cloud of data. Signals generated by receiver(s) 30 may be directed to computing device 26 for further processing. It is contemplated that the cloud data may be generated continuously during material deposition (e.g., at a set frequency) or only periodically to help reduce processing requirements. In addition, it is contemplated that the frequency of data generation may be dynamically adjusted, if desired, to improve resolution in the data cloud at particular locations.

Data cloud 35 may be utilized for many purposes. For example, data cloud 35 may be used to compare an actual surface of structure 12 to a modeled surface stored within memory 42, and to make on-the-fly adjustments to system 10 (e.g., via selective activation of output devices 40b to reduce differences. This comparison may also allow for decisions to be made regarding use or discard of structure 12. In another example, data cloud 35 of skeleton 17 may allow for custom tailoring of skin 19 and/or needed preparation (e.g., trimming or additional deposit) for skinning. An associated skinning tool path of head 16 (or another end effector—not shown) may be modified or even generated solely (e.g., without reference to the original model) based on data cloud 35.

Figure 5:
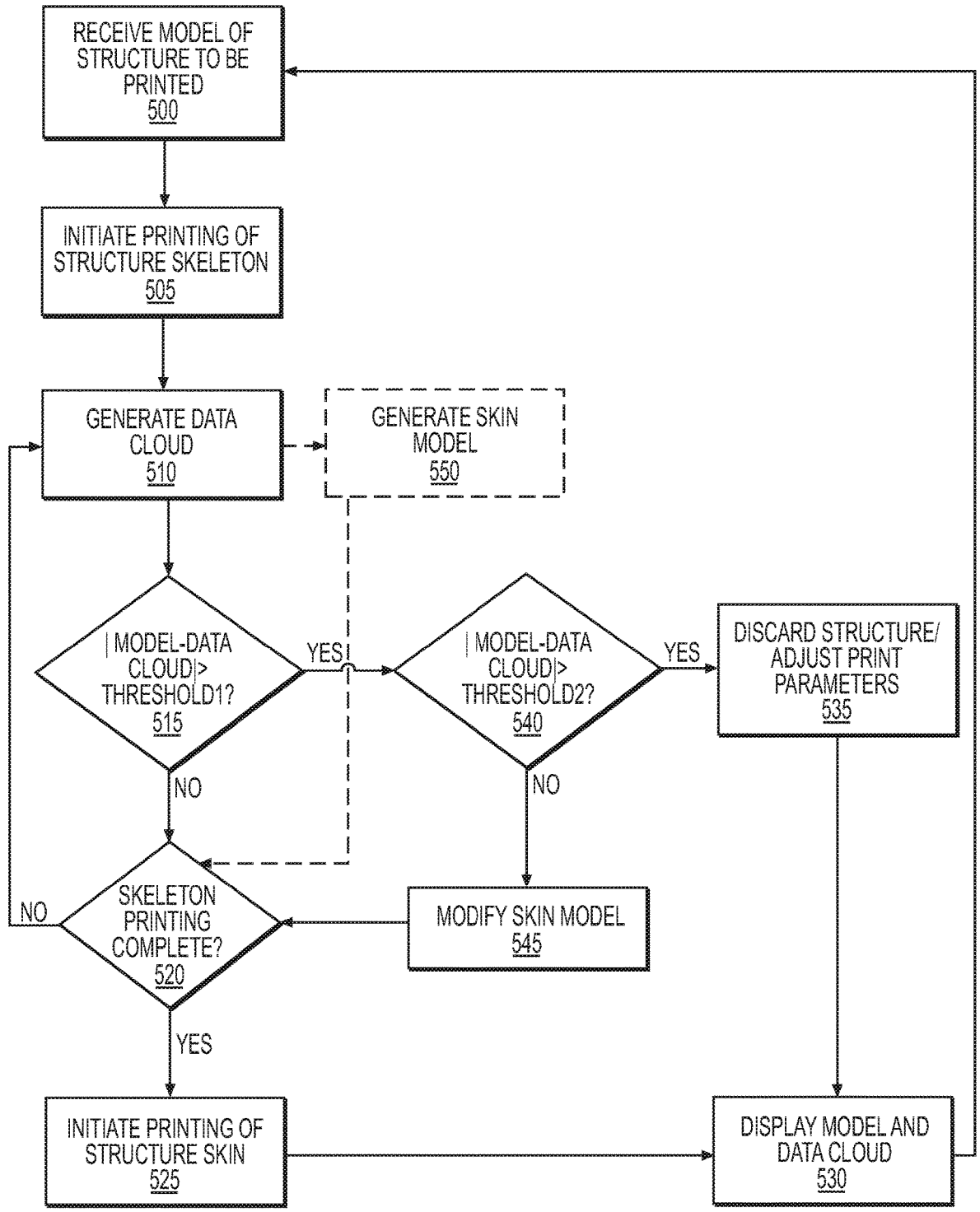
FIG. 5 is a flowchart depicting an exemplary disclosed method of operating the additive manufacturing system of FIG. 1.

FIG. 5 illustrates an exemplary method of operating system 10, which may be regulated by computing device 26. FIG. 5 will be discussed in greater detail in the following section to further illustrate the disclosed concepts.

INDUSTRIAL APPLICABILITY

The disclosed system may be used to manufacture composite structures having any desired cross-sectional shape and length. The composite structures may include any number of different fibers of the same or different types and of the same or different diameters, and any number of different matrixes of the same or different makeup. Operation of system 10 will now be described in detail.

At a start of a manufacturing event, information regarding a desired structure 12 may be loaded into system 10 (e.g., into computing device 26 that is responsible for regulating operations of support 14 and/or head 16) (Step 500). This information may include, among other things, a virtual model of structure 12, including skeleton 17 and/or skin 19 (referring to FIG. 2). It is contemplated that the model could alternatively or additionally be created by a user via computing device 26, if desired. It is also contemplated that the model and other associated information (e.g., printing parameters) may alternatively or additionally be loaded into and/or modified by system 10 at different times and/or continuously during the manufacturing event, if desired. Based on the model, one or more different reinforcements and/or matrix materials may be installed and/or continuously supplied into system 10.

The virtual model and associated component information may then be used to initiate printing of structure 12 (e.g., of skeleton 17) and/or otherwise control operation of system 10 (Step 505). For example, the in-situ wetted reinforcements may be pulled and/or pushed from outlet 22 of head 16 as support 14 selectively moves (e.g., based on known kinematics of support 14 and geometry of structure 12 known from the model), such that the resulting structure 12 is fabricated as desired.

During and/or after fabrication of structure 12 computing device 26 (e.g., processor 36) may generate data cloud 35 based on signals received from input device(s) 40a (e.g., from receiver 30) and known positions of input device(s) 40a (e.g., based on kinematics of support 14 and known spatial relationship(s) of input device(s) 40a to support 14) at a time of signal generation (Step 510). Data cloud 35 may includes images, points, lines, contours, and/or other features indicative of surface geometry of skeleton 17. For example, data cloud 35 may be representative of three-dimensional locations of composite material within structure 12. The locations may be associated with the entire structure 12, only surfaces of structure 12, and/or only particular features (e.g., at critical locations where high accuracy is required). The creation of data cloud 35 may be completed using, for example, one or more of programs 44 (e.g., apps 48) stored within memory 42

Processor 36 may then be configured to compare data cloud 35 with the virtual model of structure 12 to determine differences therebetween (Step 515). This comparison may be completed throughout fabrication of structure 12, only after particular features have been completed, and/or after fabrication has terminated. When the differences are less than a first threshold (e.g., when the differences are low enough as to not interfere with fabrication of skin 19 and/or functionality of structure 12), processor 36 may determine if fabrication of skeleton 17 is complete (Step 520). Control may cycle back to Step 510 until processor 36 determines that fabrication has been completed.

When processor 36 determines at Step 520 that fabrication of structure 12 has been completed, processor 36 may initiate printing of skin 19 (Step 525). It is contemplated that skinning may be initiated as soon as a particular feature of skeleton 17 is complete or when all of skeleton 17 is complete. It is also contemplated that, in some embodiment, structure 12 may not include skin and instead include another feature to be fabricated (e.g., via different materials and/or a different process). In these embodiments, fabrication of the additional feature may instead be initiated at Step 525.

Throughout or only at conclusion of structure fabrication, processor 36 may display results of the fabrication to a user of system 10 (Step 530). For example, processor 36 may cause the virtual model received at Step 500 and/or a representation of data cloud 35 to be shown on the GUI of display 34 (referring to FIG. 3). In one embodiment, the model and data cloud representation may be overlaid such that any differences may be visually discerned. For example, the differences may be exaggerated, highlighted, color-coded, etc. such that the user may be made aware of the locations and magnitudes of the differences.

Returning to Step 515, when the differences between the virtual model and data cloud 35 exceed the first threshold, processor 36 may compare the differences to a second threshold (Step 540). The second threshold may be associated with acceptability of structure 12 and may, in some instances be customizable by a user of system 10. When the differences exceed the second threshold, structure 12 may be discarded and/or operational parameters (e.g., matrix parameters, reinforcement parameters, compaction parameters, cure energy parameters, support movement parameters, etc.) may be adjusted (Step 535) in preparation for a next fabrication event. Control may then proceed to Step 530. For example, processor 36 may terminate material discharge from head 16 and generate an electronic flag indicating that structure 12 has failed automatic inspection and should be manually inspected, repaired, and/or discarded.

Returning to Step 540, when processor 36 determines that the differences between the virtual model and the data cloud 35 exceed the first threshold, but not the second threshold, processor 36 may modify the virtual model of skin 19 (Step 545). In particular, skin 19 may originally be modeled to overlay perfectly a perfectly fabricated skeleton. And depending on printing accuracies, even a perfectly fabricated skin may not properly engage and/or bond to a less-than perfectly fabricated skeleton. To accommodate for system inaccuracies, the skin model may be modified to match the contours of the as-fabricated skeleton. This may include, for example, modifications to tool paths, modifications to reinforcement tension levels, modifications to materials, modifications to speeds and/or cure prescriptions, etc. Control may then proceed from Step 545 to Step 520.

It is contemplated that, at Step 510, an alternative process may selectively be implemented. For example, control may pass from Step 510 to Step 550, instead of to Step 515. That is, the skin model may not actually be generated until after the comparison of the skeleton model with data cloud 35, regardless of any comparisons. This may reduce processing time and/or effort when compared with first generation and then modification of the skin model.

It is contemplated that system 10 may be utilized during fabrication only skeleton 17 and/or only skin 19, if desired. For example, computing device 26 may be utilized to monitor ongoing fabrication processes and to selectively adjust process parameters in real or near-real time and achieve better printing of subsequent layers, based on generation of data cloud 35 and comparison with the corresponding virtual model(s). That is, the disclosed system and method are not limited to fabrications of structures having different components that are manufactured in series. Similarly, instead of only adjusting process parameters, computing device 26 may be utilized to implement measures (to adjust tapers, curvatures, and other tool path trajectories; to add extra material to thin or weak areas; to generate supports for excessive overhangs; etc.) to account for and/or correct fabricated geometry of structure 12 that does not adequately match the virtual model.

It will be apparent to those skilled in the art that various modifications and variations can be made to the disclosed system. Other embodiments will be apparent to those skilled in the art from consideration of the specification and practice of the disclosed system. For example, the feedback information and control provided by computing device 26 may be used for more than just skinning structure 12. For instance, the information and control may be used to generate supports required to sustain portions of structure 12 that deviated from the original model. In another example, although non-contact energy-type receivers 30a have been described as useful in generating data cloud 35, it is contemplated that contact-type receivers (e.g., tactile receivers) may alternatively or additionally be used to generate signals indicative of surface features of structure 12. It is intended that the specification and examples be considered as exemplary only, with a true scope being indicated by the following claims and their equivalents.

What is claimed is:

1. An additive manufacturing system, comprising:
   a print head configured to discharge a material;
   a support connected to and configured to move the print head during discharge of the material to fabricate a structure;
   a receiver mounted to the print head and configured to generate a signal indicative of at least one of a shape, a size, or a location of the discharged material; and
   a processor in communication with the receiver and the support, the processor being configured to:
   generate a data cloud of the structure fabricated by the additive manufacturing system based on the signal and a known position of the receiver at a time of signal generation;
   make a comparison of the data cloud and a virtual model of the structure; and
   selectively make an adjustment to the discharge of the material based on the comparison.

2. The additive manufacturing system of claim 1, wherein:
   the structure includes a skeleton and a skin fabricated over the skeleton;
   the data cloud is associated with the skeleton; and
   the processor is configured to generate a virtual model of the skin based on the comparison.

3. The additive manufacturing system of claim 1, wherein:
the structure includes a skeleton and a skin fabricated over the skeleton;
the data cloud is associated with the skeleton; and
the processor is configured to modify an existing virtual model of the skin based on the comparison.

4. The additive manufacturing system of claim 1, further including a light source configured to scan the structure during discharging, wherein the receiver is configured to generate the signal based on an image captured of the scan.

5. The additive manufacturing system of claim 4, wherein:
the material includes a continuous reinforcement that is at least partially coated in a liquid matrix; and
the additive manufacturing system further includes a cure enhancer configured to expose the liquid matrix to a cure energy.

6. The additive manufacturing system of claim 5, wherein the cure enhancer is the light source.

7. The additive manufacturing system of claim 1, wherein the processor is configured to selectively adjust at least one of a cure enhancer, a positioning actuator, a cutter, a liquid matrix supply, or a reinforcement supply based on the comparison.

8. The additive manufacturing system of claim 1, wherein:
when the comparison indicates a difference less than a threshold, the processor is configured to make the adjustment to discharging parameters; and
when the comparison indicates a difference greater than a threshold, the processor is configured to terminate discharging.

9. The additive manufacturing system of claim 8, wherein when the comparison indicates the difference is greater than the threshold, the processor is further configured to flag the structure for discard.

10. The additive manufacturing system of claim 1, further including a display, wherein the processor is configured to cause a representation of the comparison to be shown on the display.

11. The additive manufacturing system of claim 10, wherein the representation includes the virtual model overlaid with the data cloud.

12. A method of additively manufacturing a structure, comprising:
discharging a material from a print head;
moving the print head during discharging to fabricate the structure;
generating a signal indicative of at least one of a shape, a size, or a location of the discharged material;
generating a data cloud of the structure during discharging based on the signal;
making a comparison of the data cloud and a virtual model of the structure during discharging; and
making an adjustment during discharging based on the comparison.

13. The method of claim 12, wherein:
the structure includes a skeleton and a skin fabricated over the skeleton;
the data cloud is associated with the skeleton;
the virtual model is associated with the skeleton; and
the method further includes generating a virtual model of the skin based on the comparison.

14. The method of claim 12, wherein:
the structure includes a skeleton and a skin fabricated over the skeleton;
the data cloud is associated with the skeleton;
the virtual model is associated with the skeleton; and
the method further includes modifying an existing virtual model of the skin based on the comparison.

15. The method of claim 12, further including scanning the structure with light during discharging, wherein generating the signal includes generating the signal based on an image captured of the scan.

16. The method of claim 15, wherein:
the material includes a continuous reinforcement that is at least partially coated in a liquid matrix; and
the method further includes exposing the liquid matrix to a cure energy.

17. The method of claim 16, wherein the cure energy is light.

18. The method of claim 12, wherein making the adjustment during discharging includes selectively adjusting operation of at least one of a cure enhancer, a positioning actuator, a cutter, a liquid matrix supply, or a reinforcement supply based on the comparison.

19. The method of claim 12, wherein:
when the comparison indicates a difference less than a threshold, the method includes making the adjustment to discharging parameters; and
when the comparison indicates a difference greater than a threshold, the method includes terminating discharging and flagging the structure for discard.

20. The method of claim 12, further including showing a representation of the comparison on a display, wherein the representation includes the virtual model overlaid with the data cloud.

* * * * *